(12) United States Patent
Whitaker et al.

(10) Patent No.: US 7,785,528 B2
(45) Date of Patent: Aug. 31, 2010

(54) GUIDE SYSTEM FOR SIGNAL LINES, DEVICE FOR MEASURING TEMPERATURES AND/OR CONCENTRATIONS, AND USE OF THE SYSTEM AND DEVICE

(75) Inventors: Robert Charles Whitaker, Derbyshire (GB); Andrew David Butler, Nottinghamshire (GB)

(73) Assignee: Heraeus Electro-Nite International N.V., Houthalen (BE)

( * ) Notice: Subject to any disclaimer, the term of this patent is extended or adjusted under 35 U.S.C. 154(b) by 519 days.

(21) Appl. No.: 11/181,080

(22) Filed: Jul. 14, 2005

(65) Prior Publication Data

US 2006/0012088 A1 Jan. 19, 2006

(30) Foreign Application Priority Data

Jul. 15, 2004 (GB) ................... 0415849.9

(51) Int. Cl.
*C21B 7/24* (2006.01)
*G01K 1/12* (2006.01)
*C21B 7/16* (2006.01)

(52) U.S. Cl. .............. 266/87; 266/46; 266/78; 266/88; 266/225; 374/139; 374/140; 374/145

(58) Field of Classification Search .......... 266/46, 266/78, 87, 88, 225; 374/139, 140, 145
See application file for complete search history.

(56) References Cited

U.S. PATENT DOCUMENTS

| | | | | |
|---|---|---|---|---|
| 3,672,222 A | * | 6/1972 | Stelts et al. .............. 374/140 |
| 4,075,035 A | * | 2/1978 | Trevedy .................. 136/210 |
| 5,350,158 A | * | 9/1994 | Whellock ................ 266/46 |
| 5,853,656 A | | 12/1998 | Besterman et al. |
| 6,599,464 B1 | * | 7/2003 | Feldhaus .................. 266/87 |

FOREIGN PATENT DOCUMENTS

| | | |
|---|---|---|
| EP | 0 358 793 A1 | 3/1990 |
| EP | 0 806 640 A3 | 6/1998 |
| GB | 1 333 022 | 10/1973 |
| JP | 62-144965 A | 9/1987 |
| JP | 64-041824 U | 2/1989 |
| JP | 01-314928 * | 12/1989 |
| JP | 06-109551 A | 4/1994 |
| JP | 7020120 A | 1/1995 |
| JP | 09-280960 | 10/1997 |
| JP | 2003-181601 A | 7/2003 |

OTHER PUBLICATIONS

Office Action, dated Feb. 16, 2010, in Japanese Counterpart Application No. 2005-205454 (English Translation attached).

* cited by examiner

*Primary Examiner*—Roy King
*Assistant Examiner*—Lois Zheng
(74) *Attorney, Agent, or Firm*—Panitch Schwarze Belisario & Nadel LLP

(57) ABSTRACT

A guide system for signal lines includes a guide tube, through which the signal lines are guided, a cooling system which laterally surrounds the guide tube and has at least one coolant chamber and at least one inlet and at least one outlet for the coolant. The coolant chamber is tubular in construction and is hermetically sealed by a seal at least at one end face.

16 Claims, 3 Drawing Sheets

GUIDE SYSTEM FOR SIGNAL LINES, DEVICE FOR MEASURING TEMPERATURES AND/OR CONCENTRATIONS, AND USE OF THE SYSTEM AND DEVICE

BACKGROUND OF THE INVENTION

The invention relates to a guide system for signal lines, to a device which contains these guide systems for measuring temperatures and/or concentrations, and to the use of the system and device.

Systems of this type are known, for example, from Japanese published patent application JP 09-280960. That document discloses a guide tube for an optical fiber for taking measurements in molten metals. The optical fiber is air-cooled. U.S. Pat. No. 5,853,656 discloses a carrier arrangement for a carburizing furnace, in which parts of the arrangement are cooled by air or water.

Guide systems for signal lines, in particular if used in hot or corrosive environments, for example in molten metals, such as molten iron, cast iron or steel, must be effectively cooled, so as not to impede the reception and transmission of signals, for example test signals.

BRIEF SUMMARY OF THE INVENTION

The aforementioned problem is solved by one aspect of the present invention, which comprises a guide system for signal lines comprising a guide tube, through which the signal lines are guided, a cooling system which laterally surrounds the guide tube and comprises at least one coolant chamber and at least one inlet and at least one outlet for the coolant, wherein the coolant chamber is tubular in construction and is hermetically sealed by a seal at least at one end face, which is particularly suitable for guiding the coolant. In particular, the guide tube can be guided through the seal of the end face, or can end in the seal or in the coolant chamber, the signal lines being guided through the seal.

A further advantage is that a further tube, preferably constructed as a steel tube, is guided around the guide tube in the tubular chamber, the inlet (or the outlet) being arranged in the further tube and the outlet (or the inlet) being arranged in the wall of the tubular chamber. It is particularly expedient if the end of the further (additional) tube facing the sealed end of the tubular chamber comprises at least one orifice. It is also advantageous if the further tube comprises at least one orifice in its casing. It advantageously has a plurality of orifices which are preferably distributed uniformly in the circumferential direction and/or in the longitudinal direction of the further tube. Targeted guidance of the coolant can be optimally adjusted by this further (additional) tube.

It is expedient to arrange a mixture of air and water and/or steam in the coolant chamber. A coolant of this type is highly efficient during cooling. It is also expedient if the signal lines are constructed as electric lines or as optical fibers.

According to another aspect of the invention, a device is provided for measuring temperature and/or concentrations, in particular of molten metals, which comprises a measuring end, wherein an above-described guide system is arranged at the measuring end of the device. This device is preferably constructed in such a way that a thermocouple, an electrochemical measuring cell and/or one end of an optical fiber is arranged at the measuring end or the sealed end of the guide system.

According to a further aspect of the invention, the device can be used for measuring temperatures and/or in molten metals, in particular in molten iron, cast iron or steel. Use as an immersion sensor is expedient.

According to a still further aspect of the invention, steam and/or a mixture of air and water is used as the coolant in an above-described guide system.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
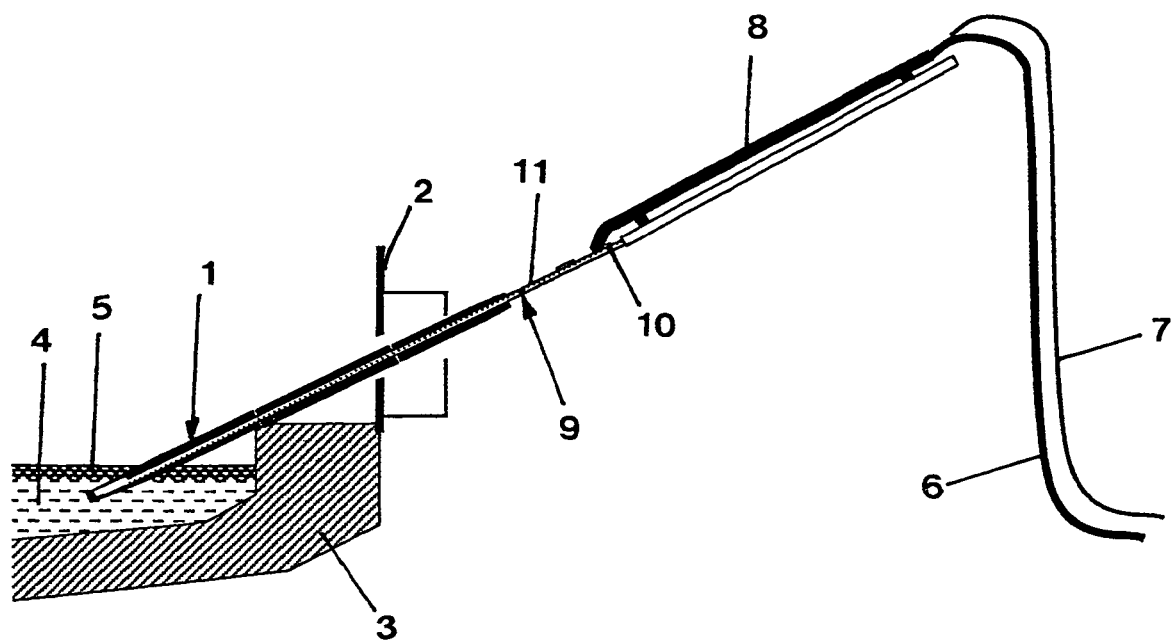
FIG. 1 is a schematic side view of a device according to one embodiment of the invention for measuring in molten steel and an arrangement thereof during measurement.

The immersion sensor 1 is immersed with its immersion end through a lateral screen 2 of the melt container 3 into a steel melt 4. At the immersion end, the immersion sensor 1 comprises an outer protective sheath made of a mixture of aluminum oxide and graphite. There is slag 5 above the molten steel 4. The components of the coolant are introduced through an air supply line 6 and a water supply line 7 into a supply tube 8, through which the mixture of air and water or steam is supplied through an inlet 10 to the guide system 9 arranged in the outer wall of the guide system 9 limiting the coolant chamber. The spent coolant can issue from the guide system 9 through the outlet 11.

For the sake of clarity, the signal line guided through the guide system and the continuation thereof from the end of the guide system applied to the melt to a measuring device is not shown in the drawings. However, arrangements of this type are generally known from the prior art and are familiar to a person skilled in the art.

An optical fiber is used as the signal line. The immersion sensor has a total length of more than 3 meters. The air is supplied to the system at a pressure of 4 bars and flows through the system at 2,000 liters per minute. The amount of water may be varied as a function of the specific application, the flow rate of water being about 1 liter per minute. The water is drawn into the system by the air stream by means of a Venturi pump (or a different type of pump, for example an electric pump), so that water cannot enter the device if the air stream fails. In the process, the water is broken down into minute droplets, so that steam is produced within the device.

When taking measurements in steel melts (at temperatures of approx. 1500° C. to over 1700° C.), the temperature inside the sensor can be kept at approx 300° C. (measured 1 minute after immersion), merely by the air stream. As soon as the water is supplied, a temperature of about 130° C. is achieved inside the immersion sensor. This temperature could be maintained for the entire immersion period of about 13 minutes. The temperature inside the sensor can be controlled by varying the throughputs. However, it is not worth reducing this temperature to less than 100° C., because there is a risk of free water formation at temperatures of less than 100° C.

Figure 2:
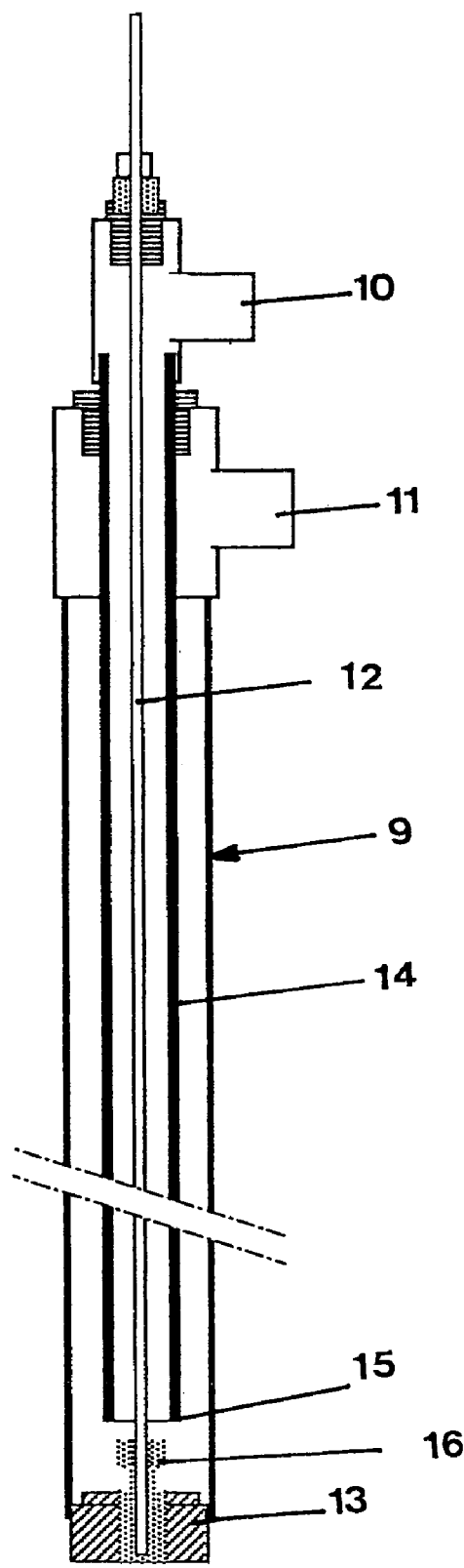
FIG. 2 is a longitudinal sectional view through a guide system according to an embodiment of the invention.

FIG. 2 shows a guide system in detail. The guide system can be more than 3 meters long in total, the inlet 10 or the outlet 11 itself being able to be more than 3 meters from the immersion end. A guide tube 12 made of stainless steel is guided centrally through the guide system. An optical fiber (not shown in the drawings) is arranged in this guide tube 12. The guide tube 12 ends inside the stopper 13 made of refractory material and sealing the guide system at the immersion end. The optical fiber is expediently guided through an orifice, which is small as possible, within the stopper 13, so that it makes direct contact with the molten steel and can absorb radiation from the molten metal by the full radiator principle and supply the radiation to a measuring and evaluating system.

After the coolant has been introduced through the inlet 10 into the guide system 9, it is conveyed relatively closely round the guide tube 12 through a further tube 14 coaxially surrounding the guide tube 12. This tube can also be formed from special steel. It ends above the stopper 13, so that the coolant will issue from the lower orifice 15 of the tube 14 and is guided within the guide system 9 to the outlet 11 and through the outlet 11 from the guide system 9.

Figure 3:
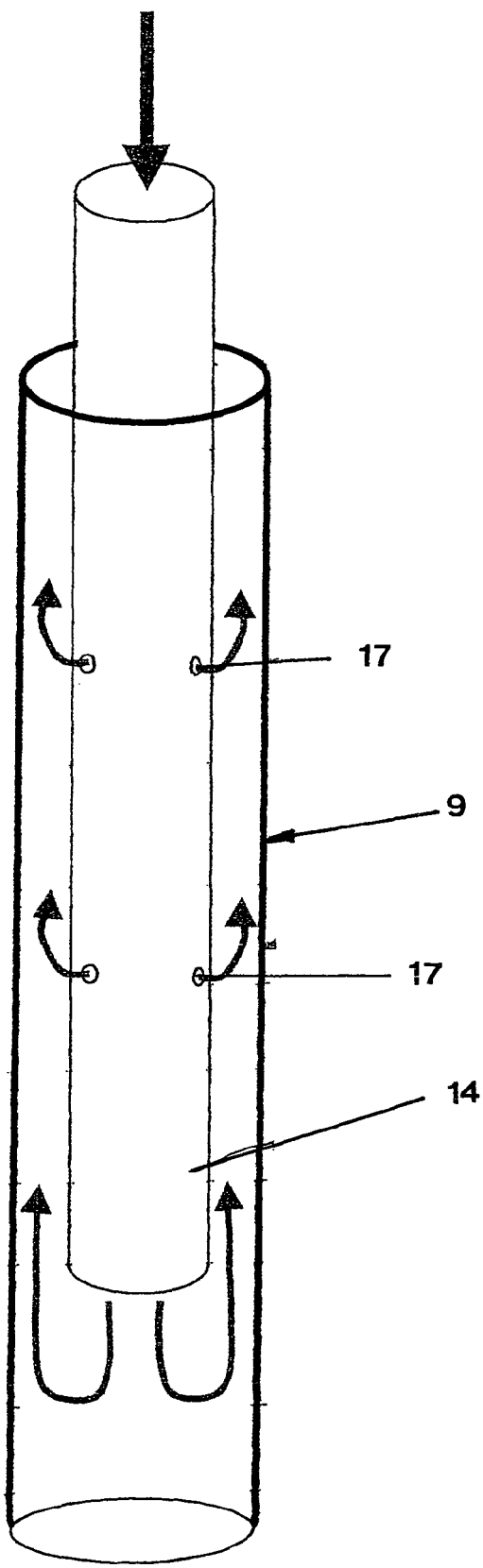
FIG. 3 is a schematic detail view of the guide system with a perforated tube surrounding the guide tube.

The tube 14 comprises a plurality of orifices 17 (FIG. 3), which are uniformly distributed in the circumferential direction and in the longitudinal direction of the tube 14. Cooling can therefore be carried out more effectively. The diameter and number of orifices 17 depend on the length of the hot zone, i.e., on the depth of immersion into the molten steel 4 and on the depth of the slag layer 5. A diameter of approx. 1 to 4 mm and a number of two to six orifices 17 (more may even be possible) provide a good cooling capacity. The arrows in FIG. 3 designate the direction of flow of the coolant.

Inside the guide system 9, the stopper 13 made of steel has a deflecting element 16 made of steel, by which the coolant stream issuing from the tube 14 is diverted and conveyed into the space between the tube 14 and the wall 9 of the cooling chamber. The stopper 13 is welded to the guide system 9. The deflecting element 16 simultaneously fixes the guide tube 12 and forms a hermetically sealed connection between the guide tube 12 and the stopper 13, to prevent the penetration of water into the guide tube 12. The material of the deflecting element 16 is heat resistant relative to the temperature of the molten steel, and is provided with a small orifice for the passage of the optical fibers at the immersion end.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A guide system for optical fibers comprising:
   a guide tube (12);
   an optical fiber guided through the guide tube;
   a cooling system laterally surrounding the guide tube (12), the cooling system comprising at least one coolant chamber and a coolant in the coolant chamber, at least one inlet (10) and at least one outlet (11) for the coolant to be supplied to and from the coolant chamber, the coolant comprising a mixture of an air stream and water droplets;
   a further tube (14), having a plurality of orifices (17), being arranged around the guide tube (12) in the coolant chamber; and
   an apparatus configured to draw the water droplets into the guide system,
   wherein the coolant chamber is tubular in construction and is hermetically sealed by a seal (13) at least at one end face of the chamber, wherein the coolant achieves and maintains a temperature of about 130° C. inside the guide tube, wherein the apparatus prevents the water droplets from entering the guide system if supply of the air stream fails, and wherein the plurality of orifices (17) are distributed in a longitudinal direction of the further tube (14).

2. The guide system according to claim 1, wherein the guide tube (12) is guided through the seal (13) of the end face.

3. The guide system according to claim 1, wherein the guide tube (12) ends in the seal (13), and the optical fibers are guided through the seal (13).

4. The guide system according to claim 1, wherein the guide tube (12) ends in the coolant chamber.

5. The guide system according to claim 1, wherein the inlet (10) is arranged in the further tube (14) and the outlet (11) is arranged in a wall of the tubular chamber.

6. The guide system according to claim 1, wherein the further tube (14) comprises a steel tube.

7. The guide system according to claim 1, wherein the end of the further tube (14) facing the sealed end of the tubular chamber comprises at least one lower orifice (15).

8. The guide system according to claim 1, wherein the plurality of orifices (17) are also distributed uniformly in a circumferential direction of the further tube (14).

9. The guide system according to claim 1, wherein the coolant is introduced through an air supply line (6) and a water supply line (7) into a supply tube (8), through which the coolant is supplied to the guide system through the at least one inlet (10).

10. The guide system according to claim 1, wherein the apparatus is a pump.

11. A device for measuring temperatures and/or concentrations comprising a measuring end, wherein a guide system (9) according to claim 1 is arranged at the measuring end of the device.

12. The device according to claim 11, wherein at least one of a thermocouple, an electrochemical measuring cell and an end of the optical fiber is arranged at the measuring end.

13. The device according to claim 11, wherein at least one of a thermocouple, an electrochemical measuring cell and an end of the optical fiber is arranged at the sealed end of the guide system (9).

14. The device according to claim 11, adapted for measuring temperatures and/or concentrations in a molten metal selected from molten iron, cast iron and steel.

15. The device according to claim 14, wherein the device comprises an immersion sensor (1).

16. A guide system for optical fibers comprising:
a guide tube (12);
an optical fiber guided through the guide tube;
a cooling system laterally surrounding the guide tube (12), the cooling system comprising at least one coolant chamber and a coolant in the coolant chamber, at least one inlet (10) and at least one outlet (11) for the coolant to be supplied to and from the coolant chamber, the coolant comprising a mixture of an air stream and water droplets;
a further tube (14), having a plurality of orifices (17), being arranged around the guide tube (12) in the coolant chamber; and
means for preventing the water droplets from entering the guide system if supply of the air stream fails,
wherein the coolant chamber is tubular in construction and is hermetically sealed by a seal (13) at least at one end face of the chamber and wherein the coolant achieves and maintains a temperature of about 130° C. inside the guide tube, and wherein the plurality of orifices (17) are distributed in a longitudinal direction of the further tube (14).

* * * * *